United States Patent
Zhou

(10) Patent No.: US 12,266,147 B2
(45) Date of Patent: Apr. 1, 2025

(54) HAND POSTURE ESTIMATION METHOD, APPARATUS, DEVICE, AND COMPUTER STORAGE MEDIUM

(71) Applicant: GUANGDONG OPPO MOBILE TELECOMMUNICATIONS CORP., LTD., Guangdong (CN)

(72) Inventor: Yang Zhou, Palo Alto, CA (US)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 497 days.

(21) Appl. No.: 17/747,837

(22) Filed: May 18, 2022

(65) Prior Publication Data

US 2022/0358326 A1 Nov. 10, 2022

Related U.S. Application Data

(63) Continuation of application No. PCT/CN2020/122933, filed on Oct. 22, 2020.
(Continued)

(51) Int. Cl.
*G06V 10/44* (2022.01)
*G06T 7/73* (2017.01)
(Continued)

(52) U.S. Cl.
CPC .............. *G06V 10/44* (2022.01); *G06T 7/73* (2017.01); *G06V 10/82* (2022.01); *G06V 40/11* (2022.01);
(Continued)

(58) Field of Classification Search
CPC .... G06V 40/103; G06V 40/11; G06V 40/113; G06V 40/28; G06V 10/454; G06V 10/82;
(Continued)

(56) References Cited

U.S. PATENT DOCUMENTS 10,706,584 B1 * 7/2020 Ye ..................... G06F 18/214
2017/0147075 A1 5/2017 Lerner et al.
(Continued)

FOREIGN PATENT DOCUMENTS

CN 104134061 A 11/2014
CN 107066935 A 8/2017
(Continued)

OTHER PUBLICATIONS

Moon, Gyeongsik, Ju Yong Chang, and Kyoung Mu Lee. "Multi-scale Aggregation R-CNN for 2D Multi-person Pose Estimation." arXiv preprint arXiv:1905.03912v1 (2019). (Year: 2019).*
(Continued)

*Primary Examiner* — Geoffrey E Summers
(74) *Attorney, Agent, or Firm* — Young Basile Hanlon & MacFarlane, P.C.

(57) ABSTRACT

Described are a hand posture estimation method, an electronic device, and a non-transitory computer-readable storage medium. The method includes: obtaining an initial feature map corresponding to a hand region in a candidate image; obtaining a fused feature map by performing feature fusion processing on the initial feature map; wherein the feature fusion processing is configured to fuse features around a plurality of key points; the plurality of key points represent skeleton key nodes of the hand region; obtaining a target feature map by performing deconvolution processing on the fused feature map; wherein the deconvolution processing is configured to adjust a resolution of the fused feature map; and obtaining coordinate information of the plurality of key points based on the target feature map to determine a posture estimation result of the hand region in the candidate image.

18 Claims, 6 Drawing Sheets

Related U.S. Application Data

(60) Provisional application No. 62/938,190, filed on Nov. 20, 2019.

(51) Int. Cl.
*G06V 10/82* (2022.01)
*G06V 40/10* (2022.01)

(52) U.S. Cl.
CPC .............. *G06T 2207/20084* (2013.01); *G06T 2207/30196* (2013.01)

(58) Field of Classification Search
CPC .......... G06V 10/44; G06T 2207/20081; G06T 2207/20084; G06T 7/70; G06T 7/73; G06T 7/75; G06T 2207/30196; G06N 3/02–0985
See application file for complete search history.

(56) References Cited

U.S. PATENT DOCUMENTS

| 2017/0168586 | A1 | 6/2017 | Sinha et al. | |
|---|---|---|---|---|
| 2019/0172223 | A1* | 6/2019 | Vajda | G06N 3/084 |
| 2020/0272888 | A1* | 8/2020 | Wang | G06V 40/103 |
| 2020/0311453 | A1* | 10/2020 | Li | G06F 18/253 |
| 2020/0372246 | A1* | 11/2020 | Chidananda | G06N 3/084 |
| 2020/0387698 | A1* | 12/2020 | Yi | G06N 3/084 |
| 2021/0081689 | A1* | 3/2021 | Weyers | G06N 3/02 |

FOREIGN PATENT DOCUMENTS

| CN | 109726659 | A | 5/2019 |
|---|---|---|---|
| CN | 110175566 | A | 8/2019 |
| CN | 111401293 | A | 7/2020 |

OTHER PUBLICATIONS

Dong, Chao, Chen Change Loy, and Xiaoou Tang. "Accelerating the super-resolution convolutional neural network." Computer Vision—ECCV 2016: 14th European Conference, Amsterdam, The Netherlands, Oct. 11-14, 2016, Proceedings, Part II 14. Springer International Publishing, 2016. (Year: 2016).*

International Search Report with English Translation for PCT Application PCT/CN2020/122933 mailed Jan. 21, 2021. (14 pages).

* cited by examiner (a)            (b)

HAND POSTURE ESTIMATION METHOD, APPARATUS, DEVICE, AND COMPUTER STORAGE MEDIUM

CROSS-REFERENCE TO RELATED APPLICATION(S)

The present application is a continuation-application of International (PCT) Patent Application No. PCT/CN2020/122933, filed on Oct. 22, 2020, which claims priority of U.S. provisional Patent Application No. 62/938,190, filed on Nov. 20, 2019, the entire contents of both of which are hereby incorporated by reference.

TECHNICAL FIELD

The present disclosure relates to the field of image identification technologies, and in particular to a hand posture estimation method, an apparatus, a device, and a computer storage medium.

BACKGROUND

The ability to reconstruct human hand motion accurately and efficiently from images has exciting new applications in regions such as immersive virtual reality and augmented reality, robot control, and sign language recognition. Reconstructing hand motion has also made great progress in recent years, especially with the arrival of consumer-grade depth cameras. However, unconstrained global and local posture variations, frequent occlusions, local self-similarity, and high intelligibility have led to inaccurate hand posture estimation results.

SUMMARY

The present disclosure provides a hand posture estimation method, an electronic device, and a computer storage medium.

In a first aspect, the present disclosure provides a hand posture estimation method, comprising: obtaining an initial feature map corresponding to a hand region in a candidate image; obtaining a fused feature map by performing feature fusion processing on the initial feature map; wherein the feature fusion processing is configured to fuse features around a plurality of key points; the plurality of key points represent skeleton key nodes of the hand region; obtaining a target feature map by performing deconvolution processing on the fused feature map; wherein the deconvolution processing is configured to adjust a resolution of the fused feature map; and obtaining coordinate information of the plurality of key points based on the target feature map to determine a hand posture estimation result of the hand region in the candidate image.

In a second aspect, the present disclosure provides an electronic device, comprising a memory and a processor; wherein, the memory is configured to store executable instructions executable on the processor; the processor is configured to perform a method as described in the first aspect when running the executable instructions.

In a third aspect, the present disclosure provides a non-transitory computer-readable storage medium, storing a computer program; wherein the computer program is executed by a first processor to perform a method as described in the first aspect.

DETAILED DESCRIPTION

To have a more detailed understanding of the features and technical content of the embodiments of the present disclosure, the implementation of the embodiments of the present disclosure will be described in detail below with reference to the accompanying drawings. The attached drawings are for reference and explanation purposes only and are not used to limit the embodiments of the present disclosure.

It should be noted that the terms "first" and "second" in the specification, claims, and the drawings of the present disclosure are intended to distinguish different objects, rather than to describe a specific sequence. In addition, the terms "including" and "having", and any variations thereof are intended to cover non-exclusive inclusions. For example, a process, method, system, product, or device that includes a series of steps or units is not limited to the listed steps or units, but optionally includes unlisted steps or units, or optionally also includes other steps or units inherent to these processes, methods, products, or devices.

In practical applications, hand posture estimation can accurately estimate three-dimensional coordinate positions of human hand skeleton nodes from an image, to reconstruct the human hand movement accurately and effectively from the image. Therefore, it is widely used in the fields of immersive virtual reality and augmented reality, robot control, and sign language recognition, and has become a key issue in the field of computer vision and human-computer interaction. With the rise and development of commercial and low-cost depth cameras, the hand posture identification has made great progress.

Especially in recent years, the successful research and development of depth cameras have made greater progress in hand posture estimation technology. Among them, the depth camera includes structured light camera, laser scanning camera, time of flight (TOF) camera, etc. In most cases, the depth camera refers to TOF camera. The so-called three-dimensional (3D) imaging of the time-of-flight method is to continuously send a light pulse to a target object, receive light returned from the target object through a sensor, and obtain a distance to the target object by detecting the time of flight (round trip) of the light pulse. That is, the TOF camera is a distance imaging camera system. It applies the time-of-flight method to measure the round-trip time of artificial light signals provided by a laser or light-emitting diode (LED) to calculate a distance between the TOF camera and the subject at each point on the image.

Figure 1:
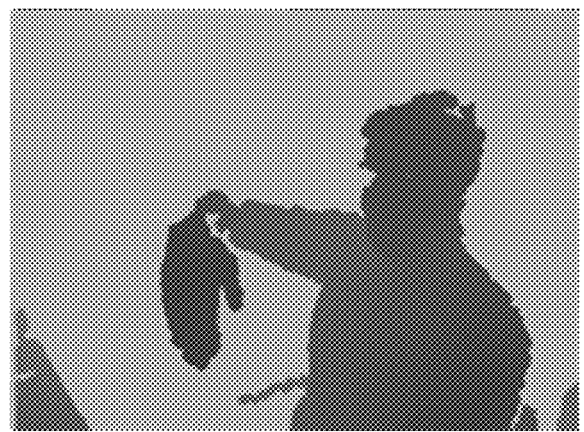
FIG. 1 is a schematic view of an image taken by a TOF camera provided by a related technical solution.

Specifically, the TOF camera outputs an image with a size of H×W, and each pixel value on this two-dimensional (2D) image can represent the depth value of the corresponding pixel. The pixel value ranges from 0 to 3000 mm. FIG. 1 is a schematic view of an image taken by a TOF camera provided by a related technical solution. In embodiments of the present disclosure, the image taken by the TOF camera may be referred to as a depth image.

Further, target detection may be performed on the depth image taken by the TOF camera. Assuming that the target is a human hand, an input of the hand detection is the depth image shown in FIG. 1, and an output may be the probability of presence of the hand in the depth map (e.g., a number between 0 and 1, with larger values indicating greater confidence in hand presence) and a hand bounding box (i.e., a bounding box indicating the position and size of the hand). Among them, the bounding box is a bounding frame. The bounding box may be expressed as (xmin, ymin, xmax, ymax), where (xmin, ymin) represents the position of an upper left corner of the bounding box, and (xmax, ymax) represents the position of a lower right corner of the bounding box.

Figure 2:
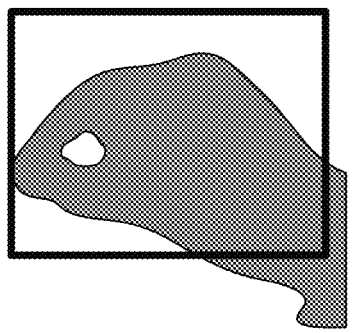
FIG. 2 is a schematic view of detection result of a hand bounding box provided by a related technical solution.

Exemplarily, FIG. 2 is a schematic view of detection result of a hand bounding box provided by a related technical solution. As shown, the black rectangular box is the hand bounding box, and a score of the hand bounding box is as high as 0.999884, that is, the confidence of the presence of the hand in the depth map is as high as 0.999884.

Figure 3:
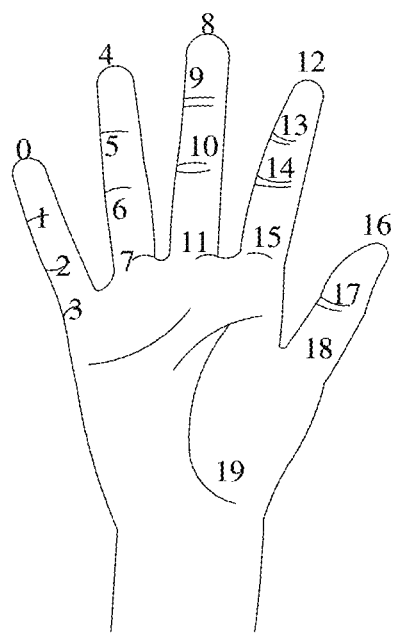
FIG. 3 is a schematic view of positions of key points of a hand skeleton provided by a related technical solution.
Figure 4:
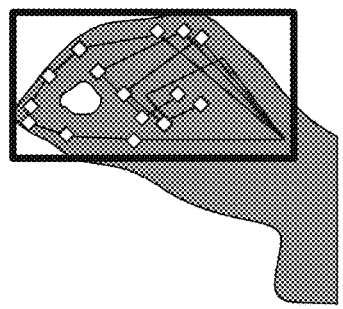
FIG. 4 is a schematic view of a two-dimensional hand posture estimation result provided by a related technical solution.

Further, on the one hand, a two-dimensional hand posture estimation may be continued based on the target detection result. Specifically, an output is a two-dimensional key point position of a hand skeleton. FIG. 3 is a schematic view of positions of key points of a hand skeleton provided by a related technical solution. As shown, the hand skeleton is provided with 20 key points, and the position of each key point is indicated with numerals 0-19 in FIG. 3. Among them, the position of each key point may be represented by 2D coordinate information (x, y). After determining the coordinate information of these 20 key points, a two-dimensional hand posture estimation result may be generated. Exemplarily, based on the two-dimensional coordinates of the key points of the hand shown in FIG. 3, FIG. 4 shows a two-dimensional hand posture estimation result provided by a related technical solution.

On the other hand, a three-dimensional hand posture estimation may also be continued based on the target detection result. Specifically, an output is a three-dimensional key point position of the hand skeleton, and an example of the key point position of the hand skeleton is still shown in FIG. 3. Among them, the position of each key point may be represented with 3D coordinate information (x, y, z), where z is the coordinate information in a depth direction.

Figure 5:
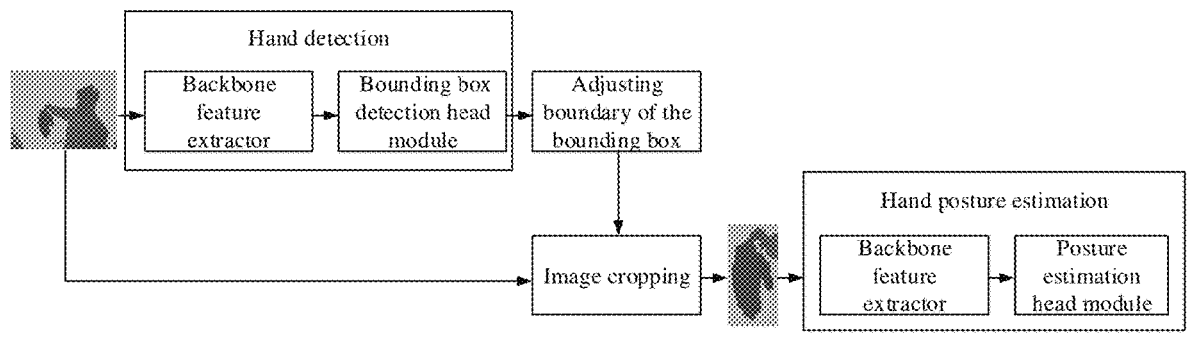
FIG. 5 is a schematic flowchart of a conventional hand posture detection provided by a related technical solution.

At present, a typical hand posture detection process may include a hand detection part and a hand posture estimation part. The hand detection part may include a backbone feature extractor and a bounding box detection head module, and the hand posture estimation part may include a backbone feature extractor and a posture estimation head module. Exemplarily, FIG. 5 is a schematic flowchart of a conventional hand posture detection provided by a related technical solution. As shown, after obtaining an original depth image including the hand, hand detection may be performed firstly, that is, a detection process is carried out using the backbone feature extractor and the bounding box detection head module included in the hand detection part; in this case, the boundary of the bounding box may be adjusted, image cropping is performed based on the adjusted bounding box, and hand posture estimation is performed on the cropped image, that is, a posture estimation process is carried out using the backbone feature extractor and the posture estimation head module included in the hand posture estimation part.

It should be noted that in the process of hand posture detection in related technical solution, the tasks of the hand detection part and hand posture estimation part are completely separated. To connect these two tasks, the position of the output bounding box may be adjusted to a centroid of the pixels in the bounding box, and the size of the bounding box may be slightly enlarged to include all the hand pixels. Further, the adjusted bounding box is configured to crop the original depth image, and the cropped image is input into the task of hand posture estimation. It should be noted that in the hand posture detection process shown in FIG. 5, the backbone feature extractor is used twice to extract image features, and there will be a problem of repeated calculations, which increases the amount of calculation.

To solve the above-mentioned problem with a large amount of calculation, a region of interest alignment (RoIAlign) algorithm may be introduced. Specifically, RoIAlign is a regional feature aggregation method, which can well solve the problem of regional misalignment caused by twice quantization in a ROI Pooling operation. In the detection task, replacing ROI Pooling with RoIAlign may improve the accuracy of the detection results. In other words, the RoIAlign layer eliminates the strict quantification of RoI Pooling, and correctly aligns the extracted features with the input.

Figure 6:
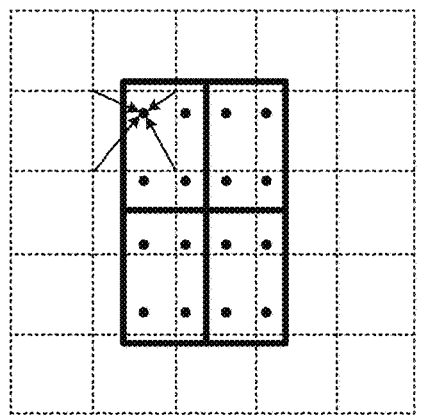
FIG. 6 is a schematic view of a RoIAlign bilinear difference effect provided by a related technical solution.

It can be seen that RoIAlign may avoid any quantization of the RoI boundary or region, (for example, using x/16 instead of [x/16]). In addition, exact values of the input features at four regularly sampled positions in each RoI region may be calculated using bilinear interpolation for summarizing the results (using either the maximum or average values). FIG. 6 is a schematic view of a RoIAlign bilinear difference effect provided by a related technical solution. As shown, a dotted grid represents a feature map, regions enclosed by bold and solid lines represents a RoI (such as 2×2 regions), and each region has 4 sampling points. RoIAlign can use adjacent grid points on the feature map to perform bilinear interpolation calculations to obtain the value of each sampling point, and for the RoI, RoI region or multiple sampling points, quantization will not be performed on any of the coordinates involved. It should be noted herein that as long as the quantization is not performed, the detection result will not be sensitive to the accuracy of the sampling position or the number of the sampling points.

In addition, non-maximum suppression (NMS) has been widely used in target detection using hand bounding boxes. It is a component of multiple detection methods such as edge, corner or target detection, which can overcome the defect that the original detection algorithm has imperfect ability to position the concept of interest, resulting in multiple detection groups appearing in the vicinity of the actual position.

Figure 7:
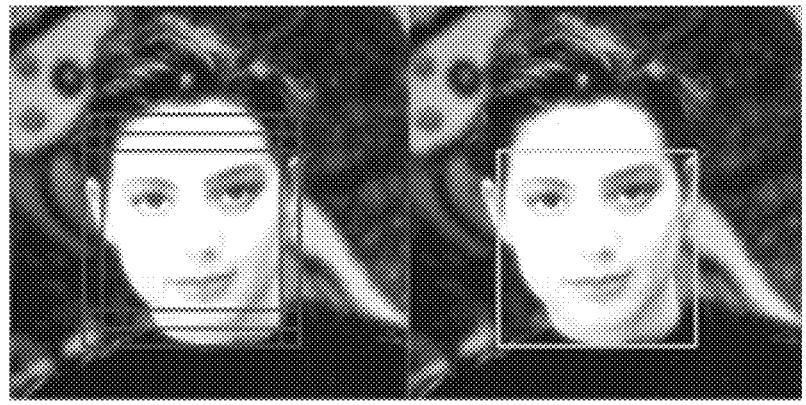
FIG. 7 is a structural schematic view of a non-maximum suppression provided by a related technical solution.

Specifically, in the context of target detection, methods based on sliding windows usually generate multiple windows with higher scores. These windows are close to the correct position of the target. However, the result of the generalization ability of the target detector, the smoothness of the response function and the near-window visual correlation leads to a relatively dense output that is usually unsatisfactory for understanding the content of the image. In other words, in this operation, the number of assumed windows is not related to the actual number of objects in the image. Therefore, the goal of NMS is to keep only one window for each detection group, which corresponds to an exact local maximum of the response function. Ideally, only one detection is obtained for each object. FIG. 7 is a structural schematic view of NMS provided by a related technical solution. As shown, the purpose of the NMS is to reserve only one window (the bold gray rectangle in FIG. 7).

Figure 8:
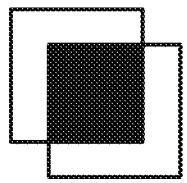
FIG. 8 is a structural schematic view of a union and an intersection provided by a related technical solution.
Figure 8:
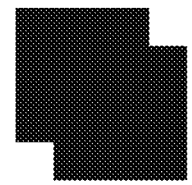

Further, FIG. 8 is a structural schematic view of a union and an intersection provided by a related technical solution. As shown, two bounding boxes are given, denoted by BB1 and BB2, respectively. The black region in (a) is the intersection of BB1 and BB2, denoted by BB1∩BB2, that is, the overlapping region of BB1 and BB2. The black region in (b) is the union of BB1 and BB2, denoted by BB1∪BB2, that is, the combined region of BB1 and BB2. Specifically, the calculation formula of the intersection ratio (expressed by IoU) is as follows, $$IoU = \frac{BB1 \cap BB2}{BB1 \cup BB2} \quad (1)$$

In addition, in the hand posture estimation, the coordinates of each pixel in the image may be represented by a XYZ coordinate system or a UVD coordinate system. (x, y, z) are the pixel coordinates in the XYZ coordinate system, and (u, v, d) are the pixel coordinates in the UVD coordinate system. Assuming that $C_x$ and $C_y$ represent principal point coordinates, they should ideally be located in the center of the image; $f_x$ and $f_y$ are focal lengths in the x direction and y direction, respectively. Specifically, the conversion relationship between the UVD coordinate system and the XYZ coordinate system is as follows, $$\begin{cases} x = \frac{(u - C_x) \times d}{f_x} \\ y = \frac{(v - C_y) \times d}{f_y} \\ z = d \end{cases} \quad (2)$$

At present, the hand posture estimation scheme either uses a fully connected layer to return the key point coordinates of the hand, or uses a classification-based method to predict the spatial position of the key point. Specifically, the regression-based method is to calculate the hand posture in a global way, that is, to use all the information of the key point feature to predict each key point; in contrast, the classification-based method favors a more localized way, that is, to progressively obtain the features of adjacent key points. It is a challenging task to perform more accurate hand posture estimation because of the unconstrained global and local posture variations, frequent occlusions, local self-similarity, and high intelligibility of the hand.

In order to solve the problems of hand posture estimation in the related art, embodiments of the present disclosure provide a hand posture estimation method, apparatus, device, and computer storage medium. Specifically, after obtaining a feature map of a hand region, the hand posture estimation apparatus may perform feature fusion processing on the image feature map and obtain deeper image information on the feature map of the hand region to fully integrate information of different key points of the hand region; and perform deconvolution processing on the feature map after feature fusion to enlarge the resolution of the image, thereby further realizing hand posture estimation. In this way, the hand posture estimation apparatus of the present disclosure may fully fuse information of different key points, thereby improving the efficiency and accuracy of hand posture estimation.

The technical solutions in the embodiments of the present disclosure will be clearly and completely described below in conjunction with the drawings in the embodiments of the present disclosure.

An embodiment of the present disclosure provides a hand posture estimation method, which may be applied to a hand posture estimation apparatus, or an electronic device integrated with the apparatus. Among them, the electronic device may be a smart phone, a tablet computer, a notebook computer, a palmtop computer, a personal digital assistant (PDA), a navigation device, a wearable device, a desktop computer, etc., which are not limited in the embodiments of the present disclosure.

Figure 9:
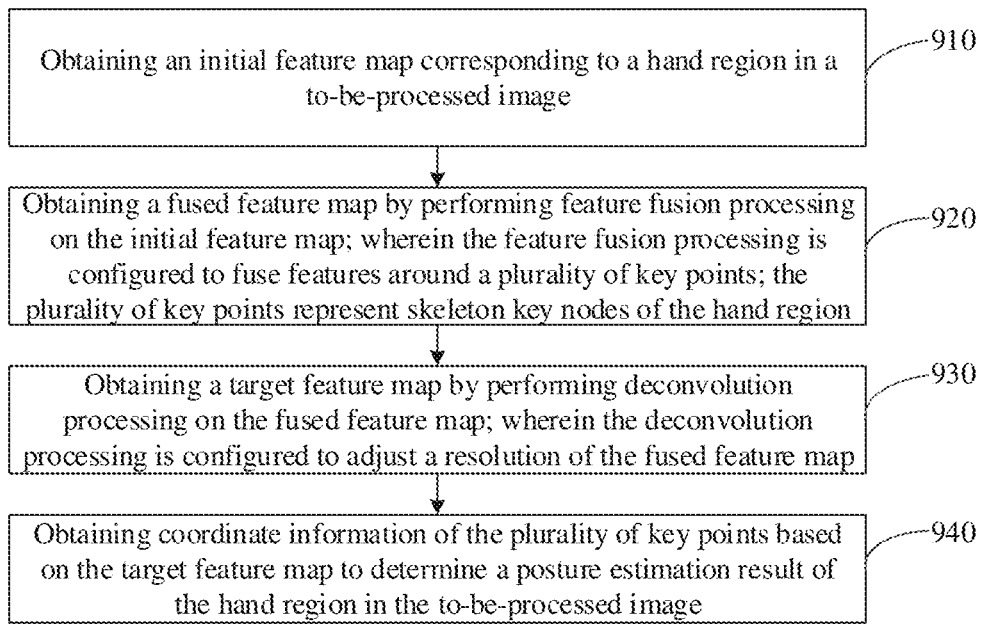
FIG. 9 is a schematic flowchart of a hand posture estimation method according to an embodiment of the present disclosure.

FIG. 9 is a schematic flowchart of a hand posture estimation method according to an embodiment of the present disclosure. As shown the hand posture estimation method provided by the embodiment of the present disclosure may include the following operations at blocks illustrated therein.

At block 910: obtaining an initial feature map corresponding to a hand region in a to-be-processed image.

In the embodiment provided in the present disclosure, the hand posture estimation apparatus may first obtain the initial feature map corresponding to the hand region in the to-be-processed image. It can be understood that the to-be-processed image may refer to a candidate image, that is required to be processed.

Specifically, in the embodiment provided in the present disclosure, the hand posture estimation apparatus may pre-obtain the to-be-processed image containing the hand, detect and identify an image content of the to-be-processed image, determine the hand region in the to-be-processed image, perform feature extraction on the hand region in the to-be-processed image by a specific feature extraction method to obtain the initial feature map corresponding to the hand region in the to-be-processed image. The initial feature map herein may be a feature map for shallow feature extraction, such as RoIAlign feature map, RoI Pooling feature map, etc.

In a possible implementation, the initial feature map is the RoIAlign feature map; that is, after the hand posture estimation apparatus obtains the hand region of the to-be-processed image, the hand posture estimation apparatus performs shallow feature extraction on the hand region of the to-be-processed image, including an approximate outline and an edge position of the hand, using the RoIAlign feature extractor constructed based on the RoIAlign feature extraction method corresponding to FIG. 6, to obtain the RoIAlign feature map corresponding to a target object, i.e., the hand.

Further, in the embodiment of the present disclosure, after obtaining the RoIAlign feature map corresponding to the to-be-processed image, the hand posture estimation apparatus may further extract deeper image information based on the RoIAlign feature map.

At block 920: obtaining a fused feature map by performing feature fusion processing on the initial feature map; wherein the feature fusion processing is configured to fuse features around a plurality of key points; the plurality of key points represent skeleton key nodes of the hand region.

It can be understood that for a human hand, there may be multiple skeleton key nodes, that is, the key points, of the hand. Normally, a hand includes at least 20 key points. In the embodiment of the present disclosure, the specific positions of the 20 key points on the hand are shown in FIG. 3.

In the embodiment provided in the present disclosure, the hand posture estimation apparatus may further perform deep-level image feature extraction on the initial feature map based on the initial feature map and fuse the features around the key points in the hand region to obtain the fused feature map.

It can be understood that the feature fusion processing is a step-by-step abstraction of the initial feature map. In the embodiment provided in the present disclosure, the hand posture estimation apparatus may perform multi-layer convolution processing on the initial feature map and extract the feature information in the initial feature map step by step. In this way, in the convolution processing of the initial feature map, detailed information (i.e., local features) of the key points in the hand region and context information (i.e., global features) of the key points may be fused layer by layer, thereby realizing the deep-level feature extraction of the initial feature map.

At block 930: obtaining a target feature map by performing deconvolution processing on the fused feature map; wherein the deconvolution processing is configured to adjust a resolution of the fused feature map.

In the embodiment provided in the present disclosure, after the fused feature map is obtained, the fused feature map may be further subjected to deconvolution processing to adjust the resolution of the fused feature map. Specifically, through the deconvolution processing, the resolution of the fused feature map is improved, such that the hand posture prediction is performed based on the higher resolution image, and the accuracy of the hand posture estimation is improved.

At block 940: obtaining coordinate information of the plurality of key points based on the target feature map to determine a posture estimation result of the hand region in the to-be-processed image.

It can be understood that the target feature map is a feature map after feature fusion processing and deconvolution processing. That is, the target feature map may fully integrate the local detail information and context information of each key point in the hand region of the original to-be-processed image. In this way, the hand posture estimation based on the target feature map may improve the accuracy of the hand posture estimation.

In the embodiment provided in the present disclosure, the method includes obtaining an initial feature map corresponding to a hand region in a to-be-processed image; obtaining a fused feature map by performing feature fusion processing on the initial feature map; wherein the feature fusion processing is configured to fuse features around a plurality of key points; the plurality of key points represent skeleton key nodes of the hand region; obtaining a target feature map by performing deconvolution processing on the fused feature map; wherein the deconvolution processing is configured to adjust a resolution of the fused feature map; and obtaining coordinate information of the plurality of key points based on the target feature map to determine a posture estimation result of the hand region in the to-be-processed image. In this way, performing feature fusion and deconvolution processing on the feature map of the hand region in the to-be-processed image can fully fuse information of different key points, improve the accuracy of hand posture estimation, and obtain high-precision hand posture estimation results.

In a possible implementation, Step 910: the obtaining an initial feature map corresponding to a hand region in a to-be-processed image, includes:
 performing identification processing on an image content of the to-be-processed image, and determining the hand region in the to-be-processed image; and
 performing RoIAlign feature extraction on the hand region in the to-be-processed image, and obtaining the initial feature map.

Specifically, the hand posture estimation apparatus may first obtain the to-be-processed image containing the hand (for example, FIG. 1), and identify and position the hand region of the to-be-processed image by means of bounding box detection, that is, to determine the position and size corresponding to the hand region, thereby obtaining the image containing only the hand region (for example, FIG. 2). Further, the hand posture estimation apparatus may use the RoIAlign feature extractor constructed based on the RoIAlign feature extraction method corresponding to FIG. 6 to perform shallow feature extraction on the hand region, including the approximate outline and edge position of the hand, to obtain the RoIAlign feature map corresponding to the target object of the hand.

Figure 10:
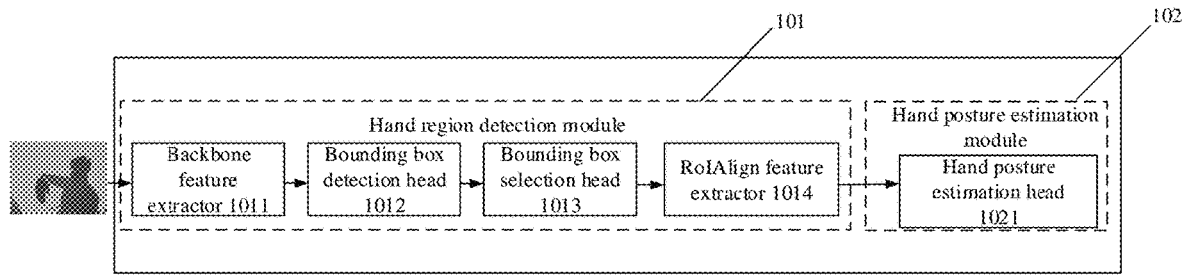
FIG. 10 is a schematic view of a network architecture of a hand posture estimation method according to an embodiment of the present disclosure.

Referring to FIG. 10, FIG. 10 is a schematic view of a network architecture of a hand posture estimation method according to an embodiment of the present disclosure. As shown, the network architecture mainly includes a hand region detection module 101 and a hand posture estimation module 102. The hand region detection module 101 includes: a backbone feature extractor 1011, a bounding box detection head 1012, a bounding box selection head 1013, and a RoIAlign feature extractor 1014. The hand posture estimation module 102 includes a hand posture estimation head 1021. Specifically, the hand region of the to-be-processed image that contains the hand region may be first detected through the backbone feature extractor 1011 and the bounding box detection head 1012; then a bounding box selection process may be performed through the bounding box selection head 1013; after the bounding box with the highest confidence is selected, that is, after the hand region image with the highest confidence is selected, RoIAlign feature extraction may be performed on the hand region image with the highest confidence through the RoIAlign feature extractor 1014 to obtain the RoIAlign feature map (i.e., the initial feature map); finally, the hand posture estimation is further performed on the RoIAlign feature map through the hand posture estimation head 1021.

Further, in the embodiment of the present disclosure, after obtaining the RoIAlign feature map corresponding to the hand region of the to-be-processed image, the hand posture estimation head 1021 may further extract deeper image information based on the RoIAlign feature map to obtain the target feature map, and obtain the hand posture estimation result based on the target feature map.

In a possible implementation manner, the step 920: obtaining a fused feature map by performing feature fusion processing on the initial feature map, may be implemented through the following steps:

Step 9201: obtaining a first feature map by performing a first convolution processing on the initial feature map through a first convolutional network; wherein the first convolution processing is configured to extract local detail information of the plurality of key points.

In the embodiments provided in the present disclosure, the initial feature map may have a specific resolution and size. For example, the size of the initial feature map may be 8×8×256.

The hand posture estimation apparatus may directly input the initial feature map into the first convolutional network to perform the first convolution processing.

In the embodiments provided in the present disclosure, the first convolutional network may be composed of two or more sub-convolutional networks with input and output superimposed on each other, and each sub-convolutional network may be a deep convolutional neural network. Through multi-layer convolution processing, the features of key points may be abstracted step by step to obtain the final first feature map.

It is to be noted that after the initial feature map is processed by the first convolutional network, the obtained first feature map has the same size as the initial feature map.

It can be understood that the resolution of the initial feature map is higher, so the detailed information of the key points in the initial feature map is richer. By performing the first convolution processing on the initial feature map, the local detail information of the key points in the initial feature map may be extracted to obtain the first feature map. In other words, the first feature map is a feature map that incorporates local detail information of key points.

Step 9202: performing a first down-sampling processing on the first feature map to obtain a first down-sampled feature map.

It can be understood that through the first down-sampling processing, the resolution of the first feature map may be further reduced. The first down-sampling processing herein may be 2 times down-sampling or 4 times down-sampling, which is not limited herein.

In the embodiments provided in the present disclosure, the first down-sampling processing may be implemented by a convolutional network, that is, the first feature map may be input into the convolutional network for convolution processing to reduce the resolution of the first feature map.

For example, the size of the first feature map is 8×8×128, and a convolutional network with a convolution kernel of 3×3×128 (step size 2) is applied to process the first feature map to obtain a 4×4×128 first down-sampled feature map.

Step 9203: obtaining a second feature map by performing a second convolution processing on the first down-sampled feature map through a second convolutional network; wherein the second convolution processing is configured to extract context information of the plurality of key points.

After obtaining the first down-sampled feature map, the hand posture estimation apparatus may input the first down-sampled feature map into the second convolutional network for convolution processing and extract the context information of the key points to obtain the second feature map.

The first down-sampled feature map is the feature map after the resolution is reduced. When the resolution of the image is low, the context information in the image is mostly. The context information of key points in the first down-sampled feature map may be sufficiently processed by the second convolution processing on the first down-sampled feature map after resolution reduction. In other words, the second feature map is a feature map that combines the local detail information and the context information of the key points.

Step 9204: obtaining the fused feature map by performing a second down-sampling processing on the second feature map.

Further, after the second feature map is obtained, the down-sampling processing is continued on the second feature map to fully fuse the global information of the key points in the second feature map to obtain the fused feature map.

It should be noted that the second down-sampling processing and the first down-sampling processing in step 9202 may be the same process or different processes, which is not limited in the embodiments of the present disclosure.

In this way, the fused feature map may contain the local detail information of the key points and contain the context-related global information of the key points. That is, the fused feature map may fully integrate the information of different key points, and the hand posture estimation based on the fused feature map may improve the accuracy of hand posture estimation and obtain high-precision hand posture estimation results.

In another possible implementation manner, in step 9201, before the performing a first convolution processing on the initial feature map through a first convolutional network, the following processing may be performed on the initial feature map:

obtaining a dimensionality-reduced feature map by performing dimensionality reduction processing on the initial feature map; wherein the dimensionality reduction processing is configured to reduce the number of channels of the initial feature map; and obtaining the first feature map by performing the first convolution processing on the dimensionality-reduced feature map through the first convolutional network, such that the fused feature map is determined by the first feature map.

It can be understood that in the process of fusing the initial feature map, the initial feature map may be reduced in dimensionality to reduce the number of channels of the initial feature map. In this way, the dimensionality-reduced feature map is subjected to the first convolution processing, the first down-sampling processing, the second convolution processing, and the second down-sampling processing, to obtain the fused feature map. In this way, by processing the dimensionality-reduced feature map, the amount of calculation in the processing may be reduced.

In the following, in conjunction with the schematic view of the architecture corresponding to the hand posture estimation head shown in FIG. 11, the above-mentioned feature fusion processing is described in detail.

Figure 11:
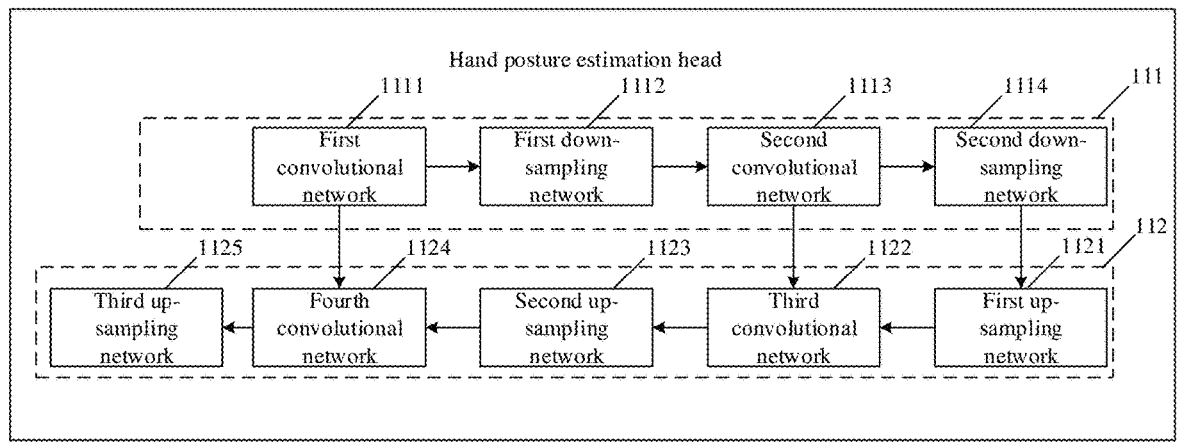
FIG. 11 is a schematic view of a corresponding architecture of a hand posture estimation head according to an embodiment of the present disclosure.

In the embodiments provided in the present disclosure, referring to FIG. 11, which is a schematic view of a corresponding architecture of a hand posture estimation head according to an embodiment of the present disclosure, the hand posture estimation head may specifically include a feature fusion module 111 (also referred to as a down-sampling module) and a deconvolution module 112 (also referred to as an up-sampling module). The feature fusion module 111 may include: a first convolutional network 1111, a first down-sampling network 1112, a second convolutional network 1113, and a second down-sampling network 1114.

The process of performing feature fusion processing on the initial feature map in step 920 may be applied to the network architecture shown in FIG. 11. Specifically, after the initial feature map is obtained, the first convolution processing is performed on the initial feature map through the first convolutional network 1111 to obtain the first feature map; then the first down-sampling processing is performed on the first feature map through the first down-sampling network 1112 to obtain the first down-sampled feature map; then the second convolution processing is performed on the first down-sampled feature map through the second convolutional network 1113 to obtain the second feature map; finally, the second down-sampling processing is performed on the second feature map through the second down-sampling network 1114 to obtain the fused feature map.

Figure 12:
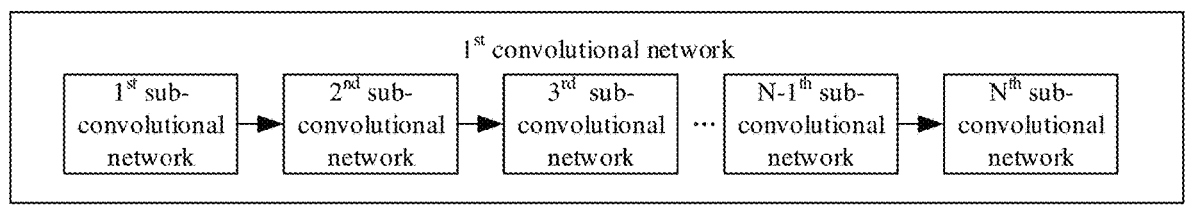
FIG. 12 is a schematic view of a structural composition of a first convolutional network according to an embodiment of the present disclosure.

In a possible implementation manner, referring to the structural composition view of a first convolutional network shown in FIG. 12, the first convolutional network may include N sub-convolutional networks, where N is an integer greater than 1.

Among them, an output of a first sub-convolutional network is connected to an input of a second sub-convolutional network, an output of the second sub-convolutional network is connected to an input of a third sub-convolutional network, and so on, an output of a N−1th sub-convolutional network is connected to an input of a Nth sub-convolutional network.

Based on this, in the embodiments provided by the present disclosure, the step 9201: the obtaining a first feature map by performing a first convolution processing on the initial feature map through a first convolutional network, may be implemented in the following ways:

In a case of i=1, an i-th convolution processing is performed on the initial feature map through an i-th sub-convolutional network, an i-th feature map is output, and the initial feature map and the i-th output feature map are processed with weighted summing to obtain an i-th weighted sum feature map; where i is an integer greater than or equal to 1 and less than N;

In a case of i not equal to 1, an i-th convolution processing is performed on an i−1th weighted sum feature map through an i-th sub-convolutional network, an i-th feature map is output, and the i−1th weighted sum feature map and the i-th output feature map are processed with weighted summing to obtain an i-th weighted sum feature map;

An i+1th convolution processing is performed on the i-th weighted sum feature map through an i+1th sub-convolutional network, and so on until an Nth convolution processing is performed on an N−1th weighted sum feature map through an Nth sub-convolutional network; the Nth weighted sum feature map is output.

A weighted summing processing is performed on the Nth weighted sum feature map and the N−1th feature map to obtain the first feature map.

In other words, after obtaining the initial feature map, the hand posture estimation apparatus first performs the first convolution processing on the initial feature map through the first sub-convolutional network, and outputs the first feature map. The initial feature map and the first feature map are processed with weighted summing to obtain the first weighted sum feature map; that is, a connection is skipped, and the input of the first sub-convolutional network is added to the output of the first sub-convolutional network to obtain the first weighted sum feature map, such that the obtained first weighted sum feature map is consistent with the size of the input initial feature map. In this way, the initial feature map is identified and abstracted through the first sub-convolutional network, and the feature information between the pixels around each key point is fused to obtain the first weighted sum feature map.

Subsequently, the second sub-convolutional network performs further processing on the first weighted sum feature map; specifically, the second convolution processing is performed on the first weighted sum feature map through the second sub-convolutional network, and the second feature map is output. A connection is skipped, and the input of the second sub-convolutional network (i.e., the first weighted sum feature map) and the output of the second sub-convolutional network (i.e., the second feature map) are processed with weighted summing to obtain the second weighted sum feature map. In this way, the first weighted sum feature map output by the first sub-convolutional network is further identified and abstracted through the second sub-convolutional network, and the feature information of the surrounding pixels of each key point may be further fused.

And so on, the third sub-convolutional network continues to process the second weighted sum feature map to obtain the third weighted sum feature map, until the Nth sub-convolutional network processes the N−1th weighted sum feature map to obtain the Nth weighted sum feature map. The N-th weighted sum feature map is taken as the final first feature map.

In this way, multi-layer convolution processing is performed on the initial feature map through the multi-level sub-convolutional network, and the feature information around the key points may be fused step by step at the current resolution.

In a possible implementation manner, Step 9203: the obtaining a second feature map by performing a second convolution processing on the first down-sampled feature map through a second convolutional network, may be implemented in the following manner:

Step 9203*a*: performing the second convolution processing on the first down-sampled feature map through the second convolutional network, and outputting a second convolutional feature map;

Step 9203*b*: performing weighted summing processing on the second convolutional feature map and the first down-sampled feature map to obtain the second feature map.

In the embodiments provided in the present disclosure, the second convolution processing may be performed on the first down-sampled feature map through the second convolutional network, and the context information (i.e., the global feature information) of the key points in the first down-sampled feature map may be further fused.

Further, a connection may be skipped, and the input of the second convolutional network (i.e., the first down-sampled feature map) and the output of the second convolutional network (i.e., the second convolutional feature map) are added to obtain the second feature map. In this way, it may be ensured that the obtained second feature map has the same size as the input first down-sampled feature map, such that a next step may be performed.

In a possible implementation manner, Step 930: the obtaining a target feature map by performing deconvolution processing on the fused feature map, may be implemented through the following steps:

Step 9301: obtaining a first up-sampled feature map by performing a first up-sampling processing on the fused feature map;

Step 9302: obtaining a third feature map by performing a third convolution processing on the first up-sampled feature map through a third convolutional network;

Step 9303: obtaining a second up-sampled feature map by performing a second up-sampling processing on the third feature map;

Step 9304: obtaining a fourth feature map by performing a fourth convolution processing on the second up-sampled feature map through a fourth convolutional network;

Step 9305: obtaining the target feature map by performing a third up-sampling processing on the fourth feature map.

In the embodiments provided in the present disclosure, the resolution of the fused feature map is small, and the resolution of the fused feature map is required to be restored, such that hand posture estimation may be performed on the high-resolution feature map to improve the hand posture estimation accuracy.

The process of restoring the resolution of the fusion feature map may correspond to the process of performing feature fusion on the initial feature map. Specifically, the first up-sampling processing corresponds to the second down-sampling processing. For example, when a feature map with a size of 4×4×128 undergoes the second down-sampling processing, the resulting feature map has a size of 2×2×256; then the feature map of 2×2×256 may be mapped to 4×4×128 through the first up-sampling processing. In addition, the third convolutional network corresponds to the second convolutional network, that is, the convolution kernel used by the third convolutional network is the same as that of the second convolutional network; the second up-sampling corresponds to the first down-sampling.

Hereinafter, in conjunction with the schematic view of the architecture corresponding to the hand posture estimation head shown in FIG. 11, the above-mentioned deconvolution processing will be described in detail.

Specifically, referring to the schematic view of the architecture corresponding to the hand posture estimation head shown in FIG. 11, the deconvolution module 112 may include a first up-sampling network 1121, a third convolutional network 1122, a second up-sampling network 1123, a fourth convolutional network 1124, and a third up-sampling network 1125.

Step 930 performs deconvolution processing on the fused feature map to obtain the target feature map, which may be applied to the network architecture shown in FIG. 11. Specifically, the first up-sampling processing is performed on the fused feature map through the first up-sampling network 1121. The first up-sampling network 1121 corresponds to the second down-sampling network 1114.

The third convolution processing is performed on the first up-sampled feature map through the third convolutional network 1122 to obtain the third feature map, where the third convolutional network 1122 corresponds to the second convolutional network 1113. Further, the second up-sampling processing is performed on the third feature map through the second up-sampling network 1123 to obtain the second up-sampled feature map, where the second up-sampling network 1123 corresponds to the first down-sampling network 1112. Then, the fourth convolution processing is performed on the second up-sampled feature map through the fourth convolutional network 1124 to obtain the fourth feature map, where the fourth convolutional network 1124 corresponds to the first convolutional network 1111. Finally, the third up-sampling processing is performed on the fourth feature map through the third up-sampling network 1125 to obtain the target feature map.

In a possible implementation manner, Step 9302: the obtaining a third feature map by performing a third convolution processing on the first up-sampled feature map through a third convolutional network, may be implemented in the following manner:

Step 9302*a*: performing the third convolution processing on the first up-sampled feature map through the third convolutional network, and outputting a third convolutional feature map;

Step 9302*b*: performing weighted summing processing on the third convolutional feature map and the second feature map to obtain the third feature map.

In the embodiments provided in the present disclosure, the third convolution processing may be performed on the first up-sampled feature map through the third convolutional network, and the third convolutional feature map is output.

It should be noted that the third convolutional network corresponds to the second convolutional network. Therefore, in the embodiments provided in the present disclosure, the hand posture estimation apparatus may perform weighted summing processing on the second feature map obtained by the second convolutional network and the third convolutional feature map output by the third convolutional network to obtain the third feature map. In this way, it can be ensured that the obtained third feature map and the second feature map have the same size, such that a next step may be performed.

In a possible implementation manner, Step 9304: the obtaining a fourth feature map by performing a fourth convolution processing on the second up-sampled feature map through a fourth convolutional network, includes:

Step 9304*a*: performing a fourth convolution processing on the second up-sampled feature map through the fourth convolutional network, and outputting a fourth convolutional feature map;

Step 9304*b*: performing weighted summing processing on the fourth convolutional feature map and the first feature map to obtain the fourth feature map.

In the embodiments provided in the present disclosure, the fourth convolution processing may be performed on the second up-sampled feature map through the third convolutional network, and the fourth convolutional feature map is output.

It should be noted that the fourth convolutional network corresponds to the first convolutional network. Therefore, in the embodiments provided in the present disclosure, the hand posture estimation apparatus may perform weighted summing processing on the first feature map obtained by the first convolutional network and the fourth convolutional feature map output by the fourth convolutional network to obtain the fourth feature map. In this way, it can be ensured that the obtained fourth feature map and the first feature map have the same size, such that a next step may be performed.

In the following, the above solution will be described in detail in combination with actual application scenarios.

Figure 13:
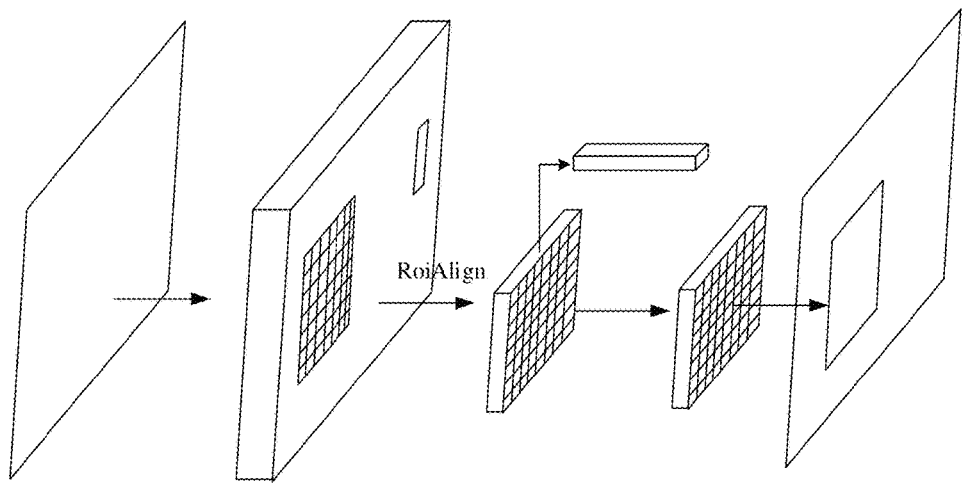
FIG. 13 is a schematic view of an architecture of a masked region convolutional neural network according to an embodiment of the present disclosure.

Referring to the architecture view of a masked region convolutional neural network (Mask R-CNN) shown in FIG. 13, in which, in parallel with the existing branches for classification and bounding box regression, R-CNN may be extended by adding a mask segmentation head to each RoI selected. The mask segmentation head may be understood as a small fully convolutional network (FCN) applied to each RoI, to estimate and predict in a pixel-to-pixel manner. Mask R-CNN is easy to implement and train, and provides a faster R-CNN framework, which facilitates extensive and flexible architecture design. In addition, the mask segmentation head only adds a small computational overhead, thus realizing a fast identification system.

Based on the Mask R-CNN architecture, referring to the schematic view of the network architecture of a hand posture estimation method shown in FIG. 10, the hand posture estimation method provided in the embodiments of the present disclosure may perform hand posture estimation for the RoIAlign feature map extracted by the RoIAlign feature extractor.

It is to be noted that the embodiments of the present disclosure may reuse the RoIAlign feature map calculated from the hand region detection task, instead of starting from the original image. Therefore, the hand posture estimation method provided by the embodiments of the present disclosure has a small amount of calculation and can be deployed on a mobile device to estimate the user's hand posture. In addition, the hand posture estimation method provided by the embodiments of the present disclosure adopts an hourglass network structure, which can fully fuse information of different key points, thereby realizing more accurate hand posture estimation.

Figure 14:
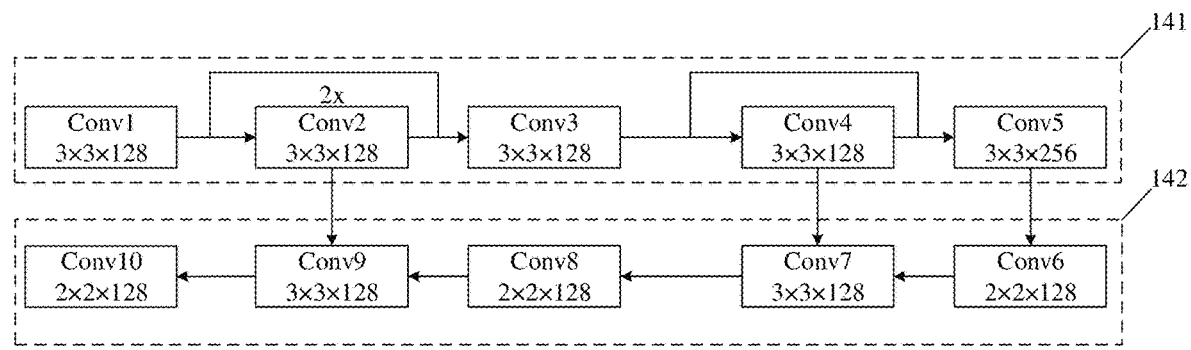
FIG. 14 is a schematic view of a network architecture of a hand posture estimation method according to another embodiment of the present disclosure.

Referring to the schematic view of a network architecture of a hand posture estimation method shown in FIG. 14, the network architecture includes a down-sampling block 141 (i.e., a feature fusion module) and an up-sampling block 142 (i.e., a deconvolution module). The down-sampling block 141 includes Conv1 to Conv5; the up-sampling block 142 includes Conv5 to Conv10.

Figure 15:
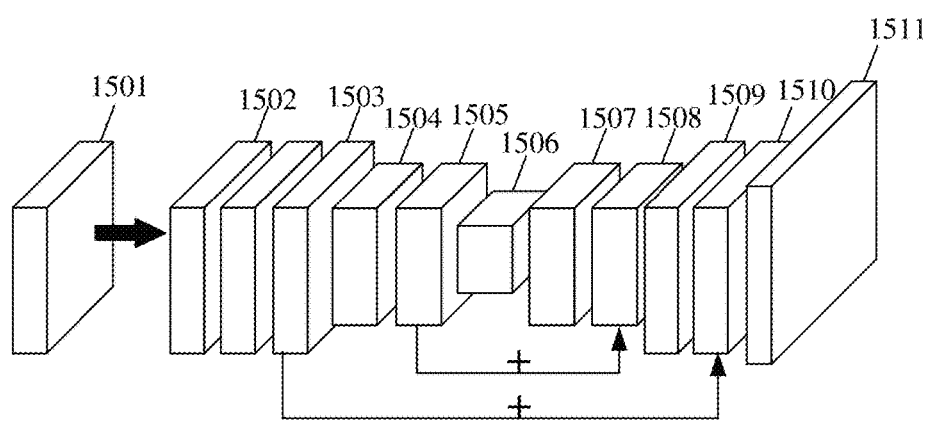
FIG. 15 is an hourglass network feature diagram during hand posture estimation according to an embodiment of the present disclosure.

Further referring to an hourglass network feature diagram during hand posture estimation shown in FIG. 15. The hand posture estimation method provided by the embodiments of the present disclosure includes the following steps:

Step a: performing convolution processing on a RoIAlign feature map 1501 (i.e., initial feature map) with a size of 8×8×256 through Conv1 (i.e., convolution layer corresponding to the dimensionality reduction processing) with a convolution kernel of 3×3×128 to obtain a dimensionality-reduced feature map 1502 with a size of 8×8×128.

In the embodiments provided in the present disclosure, the convolution kernel (3×3×128) of Conv1 is preset, and the number of channels of the RoIAlign feature map 1501 may be reduced to 128 through Conv1, and the dimensionality-reduced feature map 1520 with a size of 8×8×128 may be obtained. In this way, the dimensionality of the RoIAlign feature map 1501 is reduced for processing, thereby reducing the amount of calculation in the hand posture estimation process.

Step b: performing convolution processing on the dimensionality-reduced feature map 1502 with a size of 8×8×128 through two end-to-end Conv2 (corresponding to the above-mentioned first convolutional network), and adding a feature map input by each Conv2 and a feature map output by the each Conv2 to obtain a first feature map 1503 with the same size (i.e., 8×8×128) as the dimensionality-reduced feature map.

In other words, the dimensionality-reduced feature map may be processed twice through Conv2 to obtain the first feature map 1503 with the same size.

Step c: performing down-sampling processing on the first feature map 1503 with a size of 8×8×128 through Conv3 with a convolution kernel of 3×3×128 and a step size of 2 (i.e., the above-mentioned first down-sampling network), to obtain a first down-sampled feature map 1504 with a size of 4×4×128.

Step d: performing convolution processing on the first down-sampled feature map 1504 with a size of 4×4×128 through Conv4 with a convolution kernel of 3×3×128 (i.e., the second convolutional network mentioned above), and adding the first down-sampled feature map 1504 input by Conv4 and a feature map output by Conv4 to obtain a second feature map 1505 with the same size as the first down-sampled feature map, that is, the size of the second feature map 1505 is 4×4×128.

Step e: performing down-sampling processing on the second feature map 1505 through Conv5 with a convolution kernel of 3×3×256 and a step size of 2 (i.e., the above-mentioned second down-sampling network) to obtain a fused feature map 1506 with a size of 2×2×256.

Step f: performing up-sampling processing on the fused feature map 1506 through Conv6 with a convolution kernel of 2×2×128 (i.e., the above-mentioned first up-sampling network) to obtain a first up-sampled feature map 1507 with a size of 4×4×128.

Step g: processing the first up-sampled feature map 1507 through Conv7 with a 3×3×128 convolution kernel (i.e., the above-mentioned third convolutional network), and adding the second feature map 1505 obtained through Conv4 and a feature map output by Conv7 to obtain a third feature map 1508 with a size of 4×4×128.

In this way, it is ensured that the size of the obtained third feature map 1508 is consistent with the size of the second feature map 1505.

Step h: performing up-sampling processing on the third feature map 1508 through Conv8 with a convolution kernel of 2×2×128 (i.e., the above-mentioned second up-sampling network), to obtain a second up-sampled feature map 1509 with a size of 8×8×128.

Step i: processing the second up-sampled feature map 1509 through Conv9 with a convolution kernel of 3×3×128 (i.e., the above-mentioned fourth convolutional network), and adding the first feature map 1503 obtained through Conv1 and a feature map output by Conv9 to obtain a fourth feature map 1510 with a size of 8×8×128.

Step j: processing the fourth feature map 1510 through Conv10 with a convolution kernel of 2×2×128 (i.e., the above-mentioned third up-sampling network) to obtain a target feature map 1511 with a size of 16×16×128.

In this way, the target feature map 1511 is a feature map after feature fusion processing and deconvolution processing. It can be seen that the target feature map 1511 can fully integrate the detail information and context information of each key point in the hand region of the original to-be-processed image. Therefore, the hand posture estimation based on the target feature map 1511 may improve the accuracy of the hand posture estimation.

Figure 16:
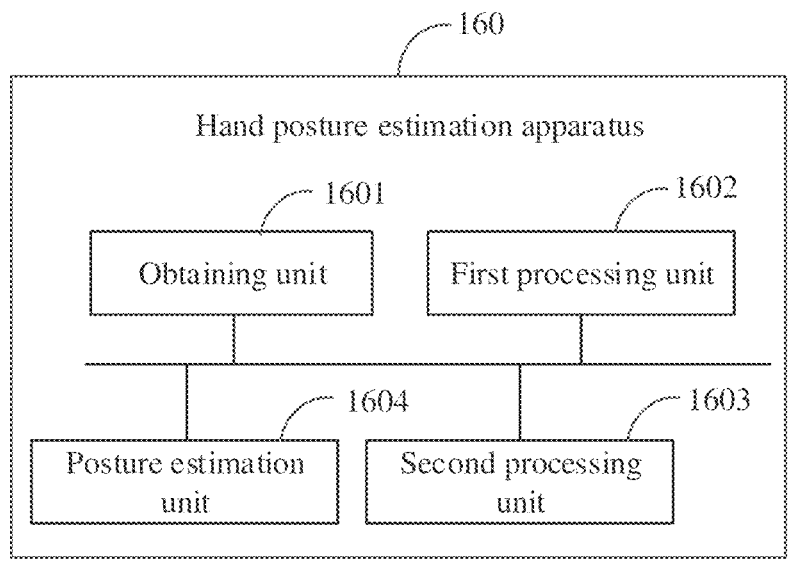
FIG. 16 is a schematic view of a composition structure of a hand posture estimation apparatus according to an embodiment of the present disclosure.

In the embodiments provided in the present disclosure, based on the same inventive concept as the foregoing embodiments, referring to FIG. 16, FIG. 16 is a schematic view of a composition structure of a hand posture estimation apparatus 160 according to an embodiment of the present disclosure. As shown, the hand posture estimation apparatus 160 may include:

an obtaining unit 1601, configured to obtain an initial feature map corresponding to a hand region in a to-be-processed image;

a first processing unit 1602, configured to obtain a fused feature map by performing feature fusion processing on the initial feature map; wherein the feature fusion processing is configured to fuse features around a plurality of key points; the plurality of key points represent skeleton key nodes of the hand region;

a second processing unit 1603, configured to obtain a target feature map by performing deconvolution processing on the fused feature map; wherein the deconvolution processing is configured to adjust a resolution of the fused feature map; and a posture estimation unit 1604, configured to obtain coordinate information of the plurality of key points based on the target feature map to determine a posture estimation result of the hand region in the to-be-processed image.

In some embodiments, the initial feature map is a region of interest alignment (RoIAlign) feature map.

In some embodiments, the obtaining unit 1601 is specifically configured to perform identification processing on an image content of the to-be-processed image and determine the hand region in the to-be-processed image; and perform RoIAlign feature extraction on the hand region in the to-be-processed image and obtain the initial feature map.

In some embodiments, the first processing unit 1602 is specifically configured to obtain a first feature map by performing a first convolution processing on the initial feature map through a first convolutional network; wherein the first convolution processing is configured to extract local detail information of the plurality of key points; perform a first down-sampling processing on the first feature map to obtain a first down-sampled feature map; obtain a second feature map by performing a second convolution processing on the first down-sampled feature map through a second convolutional network; wherein the second convolution processing is configured to extract context information of the plurality of key points; and obtain the fused feature map by performing a second down-sampling processing on the second feature map.

In some embodiments, the first processing unit 1602 is further configured to obtain a dimensionality-reduced feature map by performing dimensionality reduction processing on the initial feature map; wherein the dimensionality reduction processing is configured to reduce the number of channels of the initial feature map; and obtain the first feature map by performing the first convolution processing on the dimensionality-reduced feature map through the first convolutional network, such that the fused feature map is determined by the first feature map.

In some embodiments, the first convolutional network includes N sub-convolutional networks; N is an integer greater than 1.

The first processing unit 1602 is further configured to: in a case of i=1, perform an i-th convolution processing on the initial feature map through an i-th sub-convolutional network, output an i-th feature map, and performing weighted summing processing on the initial feature map and the i-th output feature map to obtain an i-th weighted sum feature map, where i is an integer greater than or equal to 1 and less than N; in a case of i not equal to 1, perform an i-th convolution processing on an i−1th weighted sum feature map through an i-th sub-convolutional network, output an i-th feature map is output, and performing weighted summing processing on the i−1th weighted sum feature map and the i-th output feature map to obtain an i-th weighted sum feature map; perform an i+1th convolution processing on the i-th weighted sum feature map through an i+1th sub-convolutional network, and so on until performing an Nth convolution processing on an N−1th weighted sum feature map through an Nth sub-convolutional network, outputting the Nth weighted sum feature map; and perform weighted summing processing on the Nth weighted sum feature map and the N−1th feature map to obtain the first feature map.

In some embodiments, the first processing unit 1602 is configured to perform the second convolution processing on the first down-sampled feature map through the second convolutional network, and output a second convolutional feature map; and perform weighted summing processing on the second convolutional feature map and the first down-sampled feature map to obtain the second feature map.

In some embodiments, the second processing unit 1603 is configured to obtain a first up-sampled feature map by performing a first up-sampling processing on the fused feature map; obtain a third feature map by performing a third convolution processing on the first up-sampled feature map through a third convolutional network; obtain a second up-sampled feature map by performing a second up-sampling processing on the third feature map; obtain a fourth feature map by performing a fourth convolution processing on the second up-sampled feature map through a fourth convolutional network; and obtain the target feature map by performing a third up-sampling processing on the fourth feature map.

In some embodiments, the second processing unit 1603 is configured to perform the third convolution processing on the first up-sampled feature map through the third convolutional network, and output a third convolutional feature map; and perform weighted summing processing on the third convolutional feature map and the second feature map to obtain the third feature map.

In some embodiments, the second processing unit 1603 is further configured to perform a fourth convolution processing on the second up-sampled feature map through the fourth convolutional network, and output a fourth convolutional feature map; and perform weighted summing processing on the fourth convolutional feature map and the first feature map to obtain the fourth feature map.

It can be understood that, in the embodiments, a "unit" may be a part of a circuit, a part of a processor, a part of a program or software, etc., of course, it may also be a module, or it may be non-modular. Moreover, the various components in the embodiments may be integrated into one processing unit, or each unit may exist alone physically, or two or more units may be integrated into one unit. The above-mentioned integrated unit may be realized in the form of hardware or software function module.

If the integrated unit is implemented in the form of a software function module and is not sold or used as an independent product, it can be stored in a computer readable storage medium. Based on this understanding, the part of the technical solution of the embodiments that essentially or rather contributes to the prior art or all or part of this technical solution may be embodied in the form of a software product. The computer software product is stored in a storage medium and includes several instructions to enable a computer device (which may be a personal computer, a server, or a network device, etc.) or a processor that executes all or part of the steps of the method described in the embodiments. The above-mentioned storage medium includes U disk, mobile hard disk, read only memory (ROM), random access memory (RAM), magnetic disk or optical disk and other media that can store program codes.

Therefore, the embodiments provide a computer storage medium that stores a hand posture estimation program, and the hand posture estimation program is executed by at least one processor to implement the steps described in any one of the preceding method embodiments.

Figure 17:
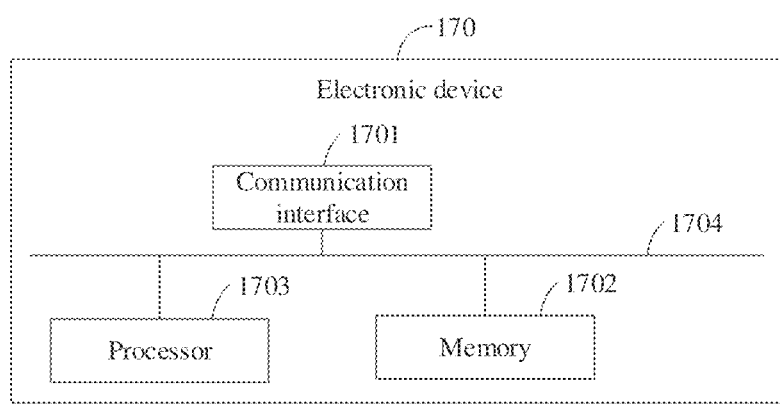
FIG. 17 is a schematic view of a specific hardware structure of an electronic device according to an embodiment of the present disclosure.

Based on the composition of the above-mentioned hand posture estimation apparatus 160 and the computer storage medium, referring to FIG. 17, FIG. 17 is a schematic view of a specific hardware structure of an electronic device 170 according to an embodiment of the present disclosure. As shown, the electronic device 170 may include: a communication interface 1701, a memory 1702, and a processor 1703; various components are coupled together through a bus system 1704. It can be understood that the bus system 1704 is configured to implement connection and communication between these components. In addition to a data bus, the bus system 1704 further includes a power bus, a control bus, and a status signal bus. However, for clarity of description, various buses are marked as the bus system 1704 in FIG. 17.

The communication interface 1701 is configured to receive and send signals in the process of sending and receiving information with other external network elements.

The memory 1702 is configured to store executable instructions that can be run on the processor 1703.

The processor 1703 is configured to, when running the executable instruction, execute:
  obtain an initial feature map corresponding to a hand region in a to-be-processed image;
  obtain a fused feature map by performing feature fusion processing on the initial feature map; wherein the feature fusion processing is configured to fuse features around a plurality of key points; the plurality of key points represent skeleton key nodes of the hand region;
  obtain a target feature map by performing deconvolution processing on the fused feature map; wherein the deconvolution processing is configured to adjust a resolution of the fused feature map; and
  obtain coordinate information of the plurality of key points based on the target feature map to determine a posture estimation result of the hand region in the to-be-processed image.

It can be understood that the memory 1702 in the embodiment of the present disclosure may be a volatile memory or a non-volatile memory or may include both volatile and non-volatile memory. Among them, the non-volatile memory may be read-only memory (ROM), programmable read-only memory (PROM), erasable programmable read-only memory (EPROM), and electrically erasable programmable read-only memory (EEPROM) or flash memory. The volatile memory may be a random-access memory (RAM), which is used as an external cache. By way of exemplary but not restrictive description, many forms of RAM are available, such as static random access memory (SRAM), dynamic random access memory (DRAM), synchronous dynamic random access memory (SDRAM), double data rate synchronous dynamic random access memory (DDRS-DRAM), enhanced synchronous dynamic random access memory (ESDRAM), synchronous link dynamic random access memory (SLDRAM), and direct Rambus random access memory (DRRAM). The memory 1702 of the systems and methods described herein is intended to include, but is not limited to, these and any other suitable types of memory.

The processor 1703 may be an integrated circuit chip with signal processing capabilities. In the implementation process, the steps of the foregoing method can be completed by hardware integrated logic circuits in the processor 1703 or instructions in the form of software. The above-mentioned processor 1703 may be a general-purpose processor, a digital signal processor (DSP), an application specific integrated circuit (ASIC), a field programmable gate array (FPGA) or other programmable logic devices, discrete gates or transistor logic devices, discrete hardware components. The methods, steps, and logical block diagrams disclosed in the embodiments of the present disclosure can be implemented or executed. The general-purpose processor may be a microprocessor, or the processor may also be any conventional processor or the like. The steps of the method disclosed in the embodiments of the present disclosure may be directly embodied as being executed and completed by a hardware decoding processor or executed and completed by a combination of hardware and software modules in the decoding processor. The software module may be in random memory, flash memory, read-only memory, programmable read-only memory or electrically rewritable programmable memory, registers and other storage media proven in the art. The storage medium is in the memory 1702, and the processor 1703 reads the information in the memory 1702 and completes the steps of the foregoing method in combination with its hardware.

It can be understood that the embodiments described herein can be implemented by hardware, software, firmware, middleware, microcode, or a combination thereof. For hardware implementation, the processing unit can be implemented in one or more application specific integrated circuits (ASIC), digital signal processor (DSP), digital signal processing device (DSPD), programmable logic device (PLD), field-programmable gate array (FPGA), general-purpose processors, controllers, microcontrollers, microprocessors, and electronic units for performing the functions described in the present disclosure, or a combination thereof.

For software implementation, the technology described herein can be implemented through modules (for example, procedures, functions, etc.) that perform the functions described herein. The software codes can be stored in the memory and executed by the processor. The memory can be implemented in the processor or external to the processor.

As another embodiment, the processor 1703 is further configured to execute the steps of the method described in any one of the foregoing embodiments when the computer program is running.

It should be noted that in the present disclosure, the terms "comprise", "include" or any other variants thereof are intended to cover non-exclusive inclusion, such that a process, method, article, or device including a set of elements includes not only those elements, but also includes other elements that are not explicitly listed, or are also inherent to such process, method, article, or device. Without further limitation, an element defined by the statement "including a . . . " does not preclude the existence of additional identical elements in the process, method, article, or device including that element.

The serial numbers of the foregoing embodiments of the present disclosure are only for description, and do not represent the superiority or inferiority of the embodiments.

The methods disclosed in the several method embodiments provided in the present disclosure may be combined arbitrarily without conflict to obtain new method embodiments.

The features disclosed in the several product embodiments provided in the present disclosure may be combined arbitrarily without conflict to obtain new product embodiments.

The features disclosed in the several method or device embodiments provided in the present disclosure may be combined arbitrarily without conflict to obtain a new method embodiment or device embodiment.

The above mentioned is only a specific implementation of the present disclosure, but the scope of the present disclosure is not limited to this, and any person skilled in the art can easily think of variations or substitutions within the technical scope disclosed in the present disclosure, which should be covered by the scope of the present disclosure. Therefore, the scope of the present disclosure shall be subject to the scope of the stated claims.

INDUSTRIAL APPLICABILITY

In the embodiments of the present disclosure, the method includes obtaining an initial feature map corresponding to a hand region in a to-be-processed image; obtaining a fused feature map by performing feature fusion processing on the initial feature map; wherein the feature fusion processing is configured to fuse features around a plurality of key points; the plurality of key points represent skeleton key nodes of the hand region; obtaining a target feature map by performing deconvolution processing on the fused feature map; wherein the deconvolution processing is configured to adjust a resolution of the fused feature map; and obtaining coordinate information of the plurality of key points based on the target feature map to determine a posture estimation result of the hand region in the to-be-processed image. In this way, performing feature fusion and deconvolution processing on the feature map of the hand region in the to-be-processed image can fully fuse information of different key points, improve the accuracy of hand posture estimation, and obtain high-precision hand posture estimation results.

What is claimed is:

1. A hand posture estimation method, comprising:
obtaining an initial feature map corresponding to a hand region in a candidate image;
obtaining a fused feature map by performing feature fusion processing on the initial feature map; wherein the feature fusion processing is configured to fuse features around a plurality of key points;
obtaining a target feature map by performing deconvolution processing on the fused feature map; wherein the deconvolution processing is configured to adjust a resolution of the fused feature map; and
obtaining coordinate information of the plurality of key points based on the target feature map to determine a posture estimation result of the hand region in the candidate image;
wherein the obtaining a fused feature map by performing feature fusion processing on the initial feature map comprises:
obtaining a first feature map by performing a first convolution processing on the initial feature map through a first convolutional network; wherein the first convolution processing is configured to extract local detail information of the plurality of key points; and
wherein before the performing a first convolution processing on the initial feature map through a first convolutional network, the method further comprises:
obtaining a dimensionality-reduced feature map by performing dimensionality reduction processing on the initial feature map; wherein the dimensionality reduction processing is configured to reduce the number of channels of the initial feature map; and
obtaining the first feature map by performing the first convolution processing on the dimensionality-reduced feature map through the first convolutional network.

2. The method according to claim 1, wherein the initial feature map is a region-of-interest alignment (RoIAlign) feature map.

3. The method according to claim 2, wherein the obtaining an initial feature map corresponding to a hand region in a candidate image comprises:
performing identification processing on an image content of the candidate image, and determining the hand region in the candidate image; and
performing RoIAlign feature extraction on the hand region in the candidate image, and obtaining the initial feature map.

4. The method according to claim 3, wherein,
the performing identification processing on an image content of the candidate image, and determining the hand region in the candidate image comprise:
obtaining the candidate image containing a hand, and identifying and positioning the hand region of the candidate image by means of a bounding box detection; and
the performing RoIAlign feature extraction on the hand region in the candidate image, and obtaining the initial feature map comprise:
performing shallow feature extraction on the hand region with a RoIAlign feature extractor to obtain a RoIAlign feature map, the hand region comprising an approximate outline and an edge position of the hand; and
taking the RoIAlign feature map as the initial feature map.

5. The method according to claim 1, wherein the obtaining a fused feature map by performing feature fusion processing on the initial feature map further comprises:
obtaining a first down-sampled feature map by performing a first down-sampling processing on the first feature map;
obtaining a second feature map by performing a second convolution processing on the first down-sampled feature map through a second convolutional network; wherein the second convolution processing is configured to extract context information of the plurality of key points; and
obtaining the fused feature map by performing a second down-sampling processing on the second feature map.

6. The method according to claim 5, wherein the first convolutional network comprises N sub-convolutional networks, where N is an integer greater than 1;
the obtaining a first feature map by performing a first convolution processing on the initial feature map through a first convolutional network comprises:
in condition of i being equal to 1, performing an i-th convolution processing on the initial feature map through an i-th sub-convolutional network, outputting an i-th feature map, and obtaining an i-th weighted sum feature map by performing weighted summing processing on the initial feature map and the i-th feature map, where i is an integer greater than or equal to 1 and less than N;
in condition of i being not equal to 1, performing the i-th convolution processing on an i-1th weighted sum feature map through an i-th sub-convolutional network, outputting an i-th feature map, and obtaining an i-th weighted sum feature map by performing weighted summing processing on the i-1th weighted sum feature map and the i-th feature map;
performing an i+1th convolution processing on the i-th weighted sum feature map through an i+1th sub-convolutional network, and so on until performing an N-th convolution processing on an N-1th weighted sum feature map through an N-th sub-convolutional network; and outputting an N-th weighted sum feature map; and obtaining the first feature map by performing weighted summing processing on the N-th weighted sum feature map and an N-1th feature map.

7. The method according to claim 5, wherein the obtaining a second feature map by performing a second convolution processing on the first down-sampled feature map through a second convolutional network comprises:

performing the second convolution processing on the first down-sampled feature map through the second convolutional network, and outputting a second convolutional feature map; and obtaining the second feature map by performing weighted summing processing on the second convolutional feature map and the first down-sampled feature map.

8. The method according to claim 5, wherein the obtaining a target feature map by performing deconvolution processing on the fused feature map comprises:

obtaining a first up-sampled feature map by performing a first up-sampling processing on the fused feature map;

obtaining a third feature map by performing a third convolution processing on the first up-sampled feature map through a third convolutional network;

obtaining a second up-sampled feature map by performing a second up-sampling processing on the third feature map;

obtaining a fourth feature map by performing a fourth convolution processing on the second up-sampled feature map through a fourth convolutional network; and obtaining the target feature map by performing a third up-sampling processing on the fourth feature map.

9. The method according to claim 8, wherein the obtaining a third feature map by performing a third convolution processing on the first up-sampled feature map through a third convolutional network comprises:

performing the third convolution processing on the first up-sampled feature map through the third convolutional network, and outputting a third convolutional feature map; and obtaining the third feature map by performing weighted summing processing on the third convolutional feature map and the second feature map.

10. The method according to claim 8, wherein the obtaining a fourth feature map by performing a fourth convolution processing on the second up-sampled feature map through a fourth convolutional network comprises:

performing a fourth convolution processing on the second up-sampled feature map through the fourth convolutional network, and outputting a fourth convolutional feature map; and obtaining the fourth feature map by performing weighted summing processing on the fourth convolutional feature map and the first feature map.

11. An electronic device, comprising a memory and a processor; wherein, the memory is configured to store executable instructions executable on the processor;

when running the executable instructions, the processor is configured to perform:

obtaining an initial feature map corresponding to a hand region in a candidate image;

obtaining a fused feature map by performing feature fusion processing on the initial feature map; wherein the feature fusion processing is configured to fuse features around a plurality of key points; the plurality of key points represent skeleton key nodes of the hand region;

obtaining a target feature map by performing deconvolution processing on the fused feature map; wherein the deconvolution processing is configured to adjust a resolution of the fused feature map; and obtaining coordinate information of the plurality of key points based on the target feature map to determine a posture estimation result of the hand region in the candidate image;

wherein the obtaining a fused feature map by performing feature fusion processing on the initial feature map comprises:

obtaining a first feature map by performing a first convolution processing on the initial feature map through a first convolutional network; wherein the first convolution processing is configured to extract local detail information of the plurality of key points; and wherein before the performing a first convolution processing on the initial feature map through a first convolutional network, the method further comprises:

obtaining a dimensionality-reduced feature map by performing dimensionality reduction processing on the initial feature map; wherein the dimensionality reduction processing is configured to reduce the number of channels of the initial feature map; and obtaining the first feature map by performing the first convolution processing on the dimensionality-reduced feature map through the first convolutional network.

12. The electronic device according to claim 11, wherein the initial feature map is a region-of-interest alignment (RoIAlign) feature map.

13. The electronic device according to claim 12, wherein in the obtaining an initial feature map corresponding to a hand region in a candidate image, the processor is further configured to perform:

performing identification processing on an image content of the candidate image, and determining the hand region in the candidate image; and performing RoIAlign feature extraction on the hand region in the candidate image, and obtaining the initial feature map.

14. The electronic device according to claim 11, wherein in the obtaining a fused feature map by performing feature fusion processing on the initial feature map, the processor is further configured to perform:

obtaining a first down-sampled feature map by performing a first down-sampling processing on the first feature map;

obtaining a second feature map by performing a second convolution processing on the first down-sampled feature map through a second convolutional network, wherein the second convolution processing is configured to extract context information of the plurality of key points; and obtaining the fused feature map by performing a second down-sampling processing on the second feature map.

15. The electronic device according to claim 14, wherein the first convolutional network comprises N sub-convolutional networks, where N is an integer greater than 1;

in the obtaining a first feature map by performing a first convolution processing on the initial feature map through a first convolutional network, the processor is further configured to perform:
   in condition of i being equal to 1, performing an i-th convolution processing on the initial feature map through an i-th sub-convolutional network, outputting an i-th feature map, and obtaining an i-th weighted sum feature map by performing weighted summing processing on the initial feature map and the i-th feature map, where i is an integer greater than or equal to 1 and less than N;
   in condition of i being not equal to 1, performing the i-th convolution processing on an i-1th weighted sum feature map through an i-th sub-convolutional network, outputting an i-th feature map, and obtaining an i-th weighted sum feature map by performing weighted summing processing on the i-1th weighted sum feature map and the i-th feature map;
   performing an i+1th convolution processing on the i-th weighted sum feature map through an i+1th sub-convolutional network, and so on until performing an N-th convolution processing on an N-1th weighted sum feature map through an N-th sub-convolutional network; and outputting an N-th weighted sum feature map; and
   obtaining the first feature map by performing weighted summing processing on the N-th weighted sum feature map and an N-1th feature map.

16. The electronic device according to claim 14, wherein in the obtaining a second feature map by performing a second convolution processing on the first down-sampled feature map through a second convolutional network, the processor is further configured to perform:
   performing the second convolution processing on the first down-sampled feature map through the second convolutional network, and outputting a second convolutional feature map; and
   obtaining the second feature map by performing weighted summing processing on the second convolutional feature map and the first down-sampled feature map.

17. The electronic device according to claim 14, wherein in the obtaining a target feature map by performing deconvolution processing on the fused feature map, the processor is further configured to perform:
   obtaining a first up-sampled feature map by performing a first up-sampling processing on the fused feature map;
   obtaining a third feature map by performing a third convolution processing on the first up-sampled feature map through a third convolutional network;
   obtaining a second up-sampled feature map by performing a second up-sampling processing on the third feature map;
   obtaining a fourth feature map by performing a fourth convolution processing on the second up-sampled feature map through a fourth convolutional network; and
   obtaining the target feature map by performing a third up-sampling processing on the fourth feature map.

18. A non-transitory computer-readable storage medium, storing a computer program;
   wherein the computer program is executed by a first processor to perform:
      obtaining an initial feature map corresponding to a hand region in a candidate image;
      obtaining a fused feature map by performing feature fusion processing on the initial feature map; wherein the feature fusion processing is configured to fuse features around a plurality of key points; the plurality of key points represent skeleton key nodes of the hand region;
      obtaining a target feature map by performing deconvolution processing on the fused feature map; wherein the deconvolution processing is configured to adjust a resolution of the fused feature map; and
      obtaining coordinate information of the plurality of key points based on the target feature map to determine a posture estimation result of the hand region in the candidate image;
   wherein the obtaining a fused feature map by performing feature fusion processing on the initial feature map comprises:
      obtaining a first feature map by performing a first convolution processing on the initial feature map through a first convolutional network; wherein the first convolution processing is configured to extract local detail information of the plurality of key points; and
   wherein before the performing a first convolution processing on the initial feature map through a first convolutional network, the method further comprises:
      obtaining a dimensionality-reduced feature map by performing dimensionality reduction processing on the initial feature map; wherein the dimensionality reduction processing is configured to reduce the number of channels of the initial feature map; and
      obtaining the first feature map by performing the first convolution processing on the dimensionality-reduced feature map through the first convolutional network.

* * * * *